United States Patent
Matsumura et al.

(10) Patent No.: US 11,889,534 B2
(45) Date of Patent: Jan. 30, 2024

(54) TERMINAL, RADIO COMMUNICATION METHOD, BASE STATION, AND SYSTEM TO PREVENT DETERIORATION OF COMMUNICATION QUALITY

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Min Liu, Beijing (CN); Huiling Li, Beijing (CN); Xin Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/054,045

(22) PCT Filed: May 10, 2018

(86) PCT No.: PCT/JP2018/018205
§ 371 (c)(1),
(2) Date: Nov. 9, 2020

(87) PCT Pub. No.: WO2019/215888
PCT Pub. Date: Nov. 14, 2019

(65) Prior Publication Data
US 2021/0235453 A1    Jul. 29, 2021

(51) Int. Cl.
*H04W 72/53* (2023.01)
*H04L 1/00* (2006.01)
(Continued)

(52) U.S. Cl.
CPC ........... *H04W 72/53* (2023.01); *H04L 1/0068* (2013.01); *H04W 72/046* (2013.01);
(Continued)

(58) Field of Classification Search
CPC .......... H04W 72/0493; H04W 72/042; H04W 72/0446; H04W 72/0453; H04W 72/046;
(Continued)

(56) References Cited

U.S. PATENT DOCUMENTS

2019/0260458 A1*  8/2019 Zhou .................... H04W 72/542
2020/0196343 A1*  6/2020 Marinier ............... H04L 1/1896
(Continued)

FOREIGN PATENT DOCUMENTS

EP          3740014 A1     11/2020

OTHER PUBLICATIONS

3GPP TSG RAN WG1 Meeting #91; R1-1721696 "Summary of Beam Mgmt." Qualcomm; Reno, USA; Nov. 27-Dec. 1, 2017 (14 pages) (Year: 2017).*

(Continued)

*Primary Examiner* — Thinh D Tran
(74) *Attorney, Agent, or Firm* — Osha Bergman Watanabe & Burton LLP

(57) ABSTRACT

To prevent deterioration of communication quality even when communication is performed by using a plurality of transmission points, one aspect of a user terminal according to the present disclosure includes: a receiving section that receives a physical shared channel transmitted from a plurality of transmission points, based on certain downlink control information; and a control section that determines at least one of rate matching, quasi-co-location, and a resource to be assigned for the physical shared channel transmitted from the plurality of transmission points, based on the downlink control information.

6 Claims, 17 Drawing Sheets

(51) Int. Cl.

| | |
|---|---|
| *H04W 72/0446* | (2023.01) |
| *H04W 72/0453* | (2023.01) |
| *H04W 72/044* | (2023.01) |
| *H04W 80/02* | (2009.01) |
| *H04W 72/23* | (2023.01) |

(52) U.S. Cl.
CPC ... *H04W 72/0446* (2013.01); *H04W 72/0453* (2013.01); *H04W 72/23* (2023.01); *H04W 80/02* (2013.01)

(58) Field of Classification Search
CPC .. H04W 80/02; H04W 72/044; H04L 1/0068; H04L 5/0053; H04L 5/0091; H04L 1/0023; H04L 1/0067; H04L 1/1854; H04L 1/1864; H04B 7/0617
See application file for complete search history.

(56) References Cited

U.S. PATENT DOCUMENTS

| | | | |
|---|---|---|---|
| 2020/0359407 A1 | 11/2020 | Takeda et al. | |
| 2021/0050936 A1* | 2/2021 | Seo | H04L 5/0053 |
| 2021/0119688 A1* | 4/2021 | Enescu | H04B 7/0404 |
| 2022/0295494 A1* | 9/2022 | Song | H04L 5/0094 |

OTHER PUBLICATIONS

Marinier et al., "Reliable Control Signaling", U.S. Appl. No. 62/667,015, filed May 4, 2018 (Year: 2018).*
Zhou et al., "Signaling of UE Intra/Inter-Panel Beam Switch Latency", U.S. Appl. No. 62/633,566, filed Feb. 21, 2018 (Year: 2018).*
Huawei, HiSilicon, "Cell and BWP in CSI-MeasConfig and TCI-State", 3GPP TSG-RAN WG2 Meeting#101bis, R2-1805326, Apr. 16-20, 2018 (Year: 2018).*
Intel, MediaTek, ZTE, Sanechips, Huawei, HiSilicon, [Samsung], "WF on remaining issues for beam failure recovery", 3GPP TSG RAN WG1 Meeting #92bis, R1-1805565, Apr. 16-20, 2018 (Year: 2018).*
Qualcomm, "Summary of Beam Mgmt.", 3GPP TSG RAN WG1 Meeting #91, R1-1721640, Nov. 27-Dec. 1, 2017 (Year: 2017).*
Qualcomm, "Summary of Beam Mgmt open issues," 3GPP TSG RAN WG1 Meeting #91, R1-1721396, Nov. 27-Dec. 1, 2017 (Year: 2017).*
Enescu; Mihai, "Beam Indication for Multi-Panel UE", U.S. Appl. No. 62/653,824, filed Apr. 6, 2018 (Year: 2018).*
International Search Report issued in PCT/JP2018/018205 dated Jul. 31, 2018 (2 pages).
Written Opinion of the International Searching Authority issued in PCT/JP2018/018205 dated Jul. 31, 2018 (4 pages).
Huawei, HiSilicon; "Discussion on control signaling for non-coherent JT"; 3GPP TSG RAN WG1 Meeting #88bis, R1-1705115; Spokane, USA; Apr. 3-7, 2017 (3 pages).
Nokia, Nokia Shanghai Bell; "Further proposals on QCL"; 3GPP TSG RAN WG1#92, R1-1803414; Athens, Greece; Feb. 26-Mar. 2, 2018 (8 pages).
Huawei, HiSilicon; "Details of QCL assumptions and related RS design considerations"; 3GPP TSG RAN WG1 Meeting #89, R1-1706940; Hangzhou, China; May 15-19, 2017 (6 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description, Stage 2 (Release 8)" Mar. 2010 (149 pages).
3GPP TSG-RAN WG1 Meeting 92bis; R1-1804787 "Beam management for NR" Qualcomm Incorporated; Sanya, China; Apr. 16-20, 2018 (8 pages).
3GPP TSG-RAN WG1 Meeting #93; R1-1806390 "QCL related issues during BWP switching" Panasonic; Busan, Korea; May 21-25, 2018 (3 pages).
3GPP TSG RAN WG1 Meeting #92bis; R1-1804035 "Remaining issues on beam management" ASUSTek; Sanya, China; Apr. 16-20, 2018 (5 pages).
3GPP TSG RAN WG1 Meeting #91; R1-1721696 "Summary of Beam Mgmt." Qualcomm; Reno, USA; Nov. 27-Dec. 1, 2017 (14 pages).
Extended European Search Report issued in European Application No. 18917977.3, dated Nov. 19, 2021 (12 pages).
Office Action issued in the counterpart Japanese Patent Application No. 2020-517713, dated Aug. 2, 2022 (4 pages).
Qualcomm Incorporated; "Remaining Details on QCL"; 3GPP TSG RAN WG1 Meeting #92, R1-1802832; Athens, Greece, Feb. 26-Mar. 2, 2018 (13 pages).
Office Action in the counterpart European Application No. 18917977.3, dated Jul. 12, 2023 (9 pages).

\* cited by examiner

FIG. 5A

| DCI | RM PATTERN CONFIGURED USING RRC |
|---|---|
| 00 | RM PATTERN #1 (CW1/DPG1), RM PATTERN #2 (CW2/DPG2) |
| 01 | RM PATTERN #3 (CW1/DPG1), RM PATTERN #4 (CW2/DPG2) |
| 10 | RM PATTERN #5 (CW1/DPG1), RM PATTERN #6 (CW2/DPG2) |
| 11 | RM PATTERN #7 (CW1/DPG1), RM PATTERN #8 (CW2/DPG2) |

FIG. 5B

| DCI | RM PATTERN CONFIGURED USING RRC |
|---|---|
| 00 | RM PATTERN #1 FOR PDSCH |
| 01 | RM PATTERN #2 FOR PDSCH |
| 10 | RM PATTERN #3 (CW1/DPG1), RM PATTERN #4 (CW2/DPG2) |
| 11 | RM PATTERN #5 (CW1/DPG1), RM PATTERN #6 (CW2/DPG2) |

| DCI | RM PATTERN CONFIGURED USING RRC | INTERPRETATION OF TRANSMISSION SCHEME |
|---|---|---|
| 000 | RM PATTERN AROUND RS (BEAM 1/DPG1), RM PATTERN AROUND RS (BEAM 1/DPG1) | SINGLE TRP TRANSMISSION FROM BEAM 1 |
| 001 | RM PATTERN AROUND RS (BEAM 2/DPG2), RM PATTERN AROUND RS (BEAM 2/DPG2) | SINGLE TRP TRANSMISSION FROM BEAM 2 |
| 010 | RM PATTERN AROUND RS (BEAM 3/DPG3), RM PATTERN AROUND RS (BEAM 3/DPG3) | SINGLE TRP TRANSMISSION FROM BEAM 3 |
| 011 | RM PATTERN AROUND RS (BEAM 1/DPG1), RM PATTERN AROUND RS (BEAM 2/DPG2) | NCJT FROM BEAMS 1 AND 2 |
| 100 | RM PATTERN AROUND RS (BEAM 1/DPG1), RM PATTERN AROUND RS (BEAM 3/DPG3) | NCJT FROM BEAMS 1 AND 3 |
| 101 | RM PATTERN AROUND RS (BEAM 2/DPG2), RM PATTERN AROUND RS (BEAM 3/DPG3) | NCJT FROM BEAMS 2 AND 3 |
| 110 | | Reserved |
| 111 | | Reserved |

FIG. 6

| DCI | RM PATTERN CONFIGURED USING RRC | INTERPRETATION OF TRANSMISSION SCHEME |
|---|---|---|
| 0000 | RM PATTERN AROUND RS (BEAM 1/DPG1), RM PATTERN AROUND RS (BEAM 1/DPG1) | SINGLE TRP TRANSMISSION FROM BEAM 1 (RM PATTERN 1) |
| 0001 | RM PATTERN AROUND RS (BEAM 1/DPG1), RM PATTERN AROUND RS (BEAM 1/DPG1) | SINGLE TRP TRANSMISSION FROM BEAM 1 (RM PATTERN 2) |
| 0010 | RM PATTERN AROUND RS (BEAM 2/DPG2), RM PATTERN AROUND RS (BEAM 2/DPG2) | SINGLE TRP TRANSMISSION FROM BEAM 1 (RM PATTERN 3) |
| 0011 | RM PATTERN AROUND RS (BEAM 2/DPG2), RM PATTERN AROUND RS (BEAM 2/DPG2) | SINGLE TRP TRANSMISSION FROM BEAM 1 (RM PATTERN 4) |
| 0100 | RM PATTERN AROUND RS (BEAM 3/DPG3), RM PATTERN AROUND RS (BEAM 3/DPG3) | SINGLE TRP TRANSMISSION FROM BEAM 1 (RM PATTERN 5) |
| 0101 | RM PATTERN AROUND RS (BEAM 3/DPG3), RM PATTERN AROUND RS (BEAM 3/DPG3) | SINGLE TRP TRANSMISSION FROM BEAM 1 (RM PATTERN 6) |
| 0110 | RM PATTERN AROUND RS (BEAM 1/DPG1), RM PATTERN AROUND RS (BEAM 2/DPG2) | NCJT FROM BEAMS 1 AND 2 (RM PATTERN 7) |
| 0111 | RM PATTERN AROUND RS (BEAM 1/DPG1), RM PATTERN AROUND RS (BEAM 2/DPG2) | NCJT FROM BEAMS 1 AND 2 (RM PATTERN 8) |
| ⋮ | ⋮ | ⋮ |
| ⋮ | RM PATTERN AROUND RS (BEAM 1/DPG1), RM PATTERN AROUND RS (BEAM 3/DPG3) | NCJT FROM BEAMS 1 AND 3 (RM PATTERN X1) |
| ⋮ | RM PATTERN AROUND RS (BEAM 1/DPG1), RM PATTERN AROUND RS (BEAM 3/DPG3) | NCJT FROM BEAMS 1 AND 3 (RM PATTERN X2) |
| ⋮ | RM PATTERN AROUND RS (BEAM 2/DPG2), RM PATTERN AROUND RS (BEAM 3/DPG3) | NCJT FROM BEAMS 2 AND 3 (RM PATTERN Y1) |
| ⋮ | RM PATTERN AROUND RS (BEAM 2/DPG2), RM PATTERN AROUND RS (BEAM 3/DPG3) | NCJT FROM BEAMS 2 AND 3 (RM PATTERN Y2) |
| ⋮ | ⋮ | ⋮ |

FIG. 7

| DCI | TCI CONFIGURATION CONFIGURED USING RRC | INTERPRETATION OF TRANSMISSION SCHEME |
|---|---|---|
| 000 | TCI CONFIGURATION (BEAM 1/DPG1), TCI CONFIGURATION (BEAM 1/DPG1) | SINGLE TRP TRANSMISSION FROM BEAM 1 (TCI CONFIGURATION 1) |
| 001 | TCI CONFIGURATION (BEAM 1/DPG1), TCI CONFIGURATION (BEAM 1/DPG1) | SINGLE TRP TRANSMISSION FROM BEAM 1 (TCI CONFIGURATION 2) |
| 010 | TCI CONFIGURATION (BEAM 1/DPG1), TCI CONFIGURATION (BEAM 1/DPG1) | SINGLE TRP TRANSMISSION FROM BEAM 1 (TCI CONFIGURATION 3) |
| 011 | TCI CONFIGURATION (BEAM 2/DPG2), TCI CONFIGURATION (BEAM 2/DPG2) | SINGLE TRP TRANSMISSION FROM BEAM 2 (TCI CONFIGURATION 4) |
| 100 | TCI CONFIGURATION (BEAM 2/DPG2), TCI CONFIGURATION (BEAM 2/DPG2) | SINGLE TRP TRANSMISSION FROM BEAM 2 (TCI CONFIGURATION 5) |
| 101 | TCI CONFIGURATION (BEAM 2/DPG2), TCI CONFIGURATION (BEAM 2/DPG2) | SINGLE TRP TRANSMISSION FROM BEAM 2 (TCI CONFIGURATION 6) |
| 110 | TCI CONFIGURATION (BEAM 1/DPG1), TCI CONFIGURATION (BEAM 2/DPG2) | NCJT FROM BEAMS 1 AND 2 (TCI CONFIGURATION 7) |
| 111 | TCI CONFIGURATION (BEAM 1/DPG1), TCI CONFIGURATION (BEAM 2/DPG2) | NCJT FROM BEAMS 1 AND 2 (TCI CONFIGURATION 8) |

FIG.9

TERMINAL, RADIO COMMUNICATION METHOD, BASE STATION, AND SYSTEM TO PREVENT DETERIORATION OF COMMUNICATION QUALITY

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of achieving a wider band and higher speed in comparison with LTE (also referred to as LTE Rel. 8 or Rel. 9), the specifications of LTE-A (also referred to as LTE Advanced, LTE Rel. 10, Rel. 11, or Rel. 12) have been drafted. Successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14" "LTE Rel. 15" (or later versions), and so on) are also under study.

In existing LTE systems (for example, LTE Rel. 8 to Rel. 13), a user terminal (UE (User Equipment)) controls reception of a downlink shared channel (for example, a PDSCH (Physical Downlink Shared Channel)), based on downlink control information (DCI, also referred to as DL assignment, and so on) from a radio base station. The user terminal controls transmission of an uplink shared channel (for example, a PUSCH (Physical Uplink Shared Channel)), based on DCI (also referred to as a UL grant and so on).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR, 5G, 5G+, or Rel. 16 or later versions), performing communication by using beamforming (BF (Beam Forming)) has been under study. In order to enhance communication quality using BF, controlling at least one of transmission and reception of signals in consideration of a relationship of quasi-co-location (QCL) (QCL relationship) between a plurality of signals has been under study.

In the future radio communication systems, it is also assumed that DL signals (for example, PDSCHs) that may be non-coherent (non-coherent transmission) are transmitted in coordination from a plurality of transmission points. In this case, it is also considered that scheduling of the PDSCHs transmitted from the plurality of transmission points is controlled by using one or a plurality of pieces of downlink control information (or PDSCHs).

However, when scheduling of the PDSCHs transmitted from the plurality of transmission points is controlled by using certain DCI (for example, a single piece of DCI), how to control receiving processing of the PDSCHs and so on is a problem. For example, in the receiving processing, the UE needs to perform rate matching processing, determination of quasi-co-location (QCL), determination of a resource to be assigned to the PDSCHs, and so on. However, specific receiving processing has not yet been fully studied. If the receiving processing is not appropriately performed, quality of communication using a plurality of transmission points may be deteriorated.

The present disclosure is made in the light of the circumstances described above, and has an object to provide a user terminal and a radio communication method that are capable of preventing deterioration of communication quality even when communication is performed by using a plurality of transmission points.

Solution to Problem

A user terminal according to one aspect of the present disclosure includes: a receiving section that receives a physical shared channel transmitted from a plurality of transmission points, based on certain downlink control information; and a control section that determines at least one of rate matching, quasi-co-location, and a resource to be assigned for the physical shared channel transmitted from the plurality of transmission points, based on the downlink control information.

Advantageous Effects of Invention

According to one aspect of the present disclosure, deterioration of communication quality can be prevented even when communication is performed by using a plurality of transmission points.

BRIEF DESCRIPTION OF DRAWINGS

FIG. 5A and FIG. 5B are each a diagram to show an example of a table that defines bit values of DCI and RM patterns;

FIG. 6 is a diagram to show another example of a table that defines bit values of DCI and RM patterns;

FIG. 7 is a diagram to show another example of a table that defines bit values of DCI and RM patterns;

FIG. 9 is a diagram to show an example of a table that defines bit values of DCI and TCI configurations;

DESCRIPTION OF EMBODIMENTS

In the future radio communication systems, performing non-coherent DL (for example, PDSCH) transmission from each of a plurality of transmission points has been under study. Transmission in which non-coherent DL signals (or DL channels) are performed in coordination from a plurality of transmission points may be referred to as NCJT (Non-Coherent Joint Transmission). In this specification, the transmission point (TRP) may be interpreted as a panel or a cell.

It is also assumed that scheduling of non-coherent PDSCHs transmitted from each of the plurality of transmission points is controlled by using certain DCI (for example, a single piece of DCI).

In this case, it is also considered that PDSCHs transmitted from different transmission points are transmitted by being assigned to the same resource (for example, time and frequency resource). For example, a configuration in which PDSCHs corresponding to the same codeword (CW) are transmitted in different layers (see FIG. 1A) and a configuration in which PDSCHs corresponding to different CWs are transmitted (see FIG. 1B) are supported.

Figure 1A:
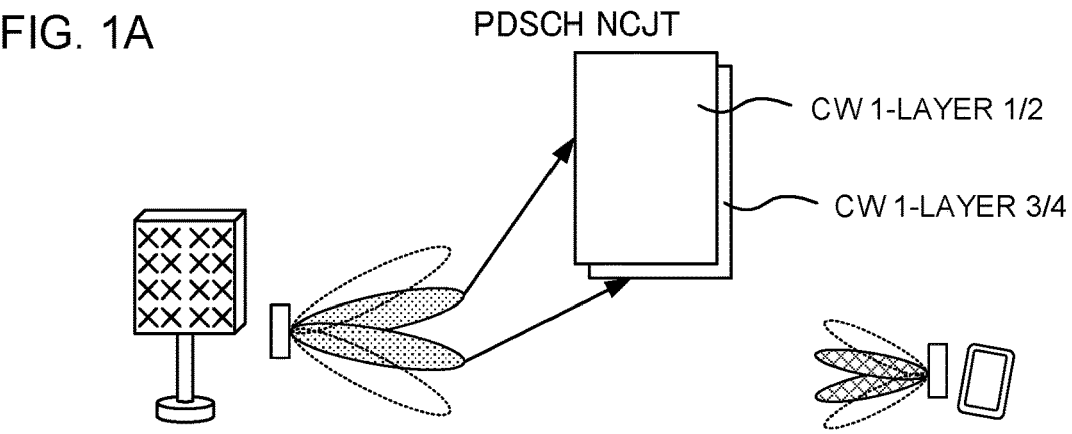
FIG. 1A to FIG. 1C are each a diagram to show an example of a case in which PDSCHs are transmitted from a plurality of transmission points.

FIG. 1A shows a case in which a PDSCH (corresponding to CW #1) that is transmitted from a first transmission point uses at least one of layers 1 and 2 and a PDSCH (corresponding to CW #1) that is transmitted from a second transmission point uses at least one of layers 3 and 4, so that both the PDSCHs are assigned to the same time and frequency resource.

Figure 1B:
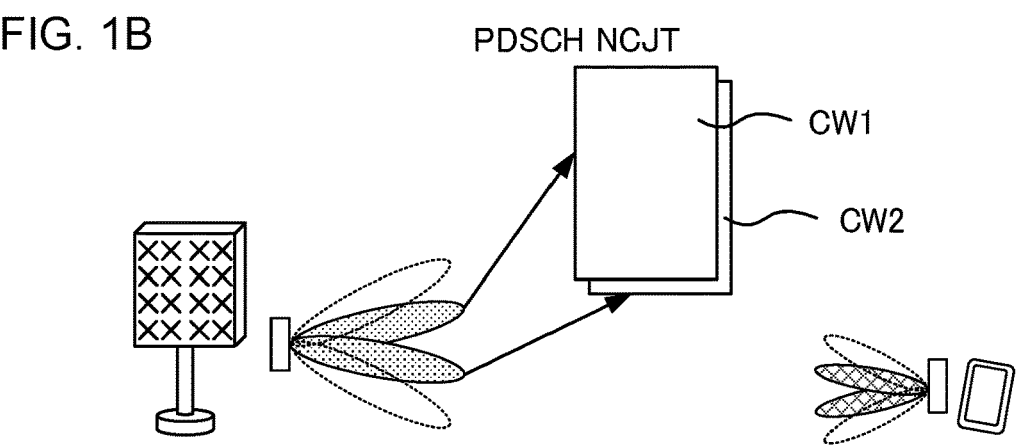

FIG. 1B shows a case in which a PDSCH (corresponding to CW #1) that is transmitted from the first transmission point and a PDSCH (corresponding to CW #2) that is transmitted from the second transmission point are assigned to the same time and frequency However, when PDSCHs transmitted from the plurality of transmission points are scheduled by using a single piece of DCI, how to control a rate matching report, a quasi-co-location (QCL) report, and so on in receiving processing of the PDSCHs is a problem. Alternatively, how to determine a certain field (for example, an MCS, an NDI, an RV, and so on) of downlink control information for transmission from the plurality of transmission points is a problem.

Figure 1C:
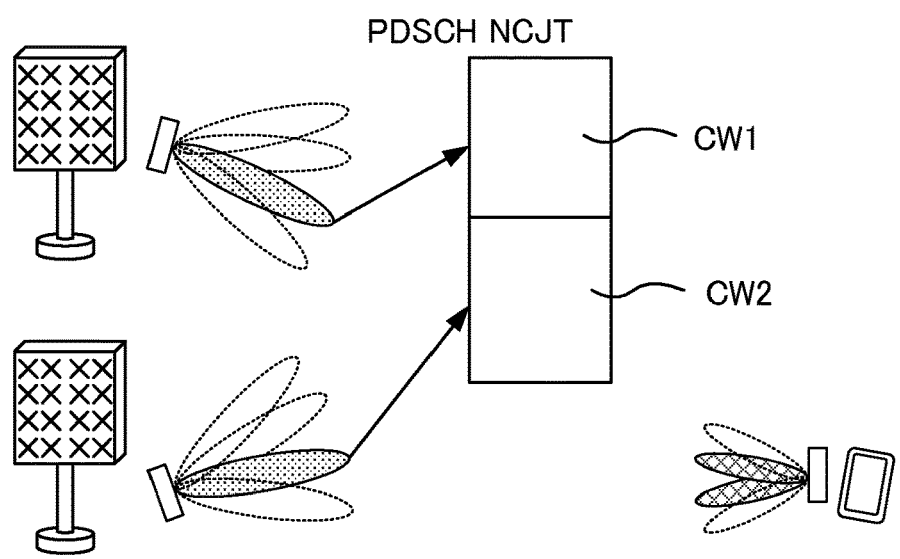

It may be considered that PDSCHs transmitted from different transmission points are transmitted by being assigned to different resources (for example, time and frequency resources) (see FIG. 1C). FIG. 1C shows a case in which a PDSCH (corresponding to CW #1) that is transmitted from the first transmission point and a PDSCH (corresponding to CW #2) that is transmitted from the second transmission point are assigned to different time and frequency resources.

However, when the PDSCHs transmitted from the plurality of transmission points are scheduled by using a single piece of DCI, how to report resource assignment of the PDSCHs from each of the transmission points (different resource assignments) is a problem.

The inventors of the present invention focused on a configuration in which certain DCI (for example, a single piece of DCI) corresponds to a plurality of PDSCHs when the PDSCHs transmitted from a plurality of transmission points are scheduled by using the certain DCI, and came up with the idea of performing reporting necessary at the time of receiving processing of each PDSCH by using the certain DCI.

In one aspect of the present disclosure, the UE determines at least one of rate matching, quasi-co-location, and a resource to be assigned for physical shared channels transmitted from a plurality of transmission points, based on certain DCI. Note that the quasi-co-location (QCL) may be a transmission configuration indicator (TCI).

(QCL for PDSCH)

Here, the quasi-co-location (QCL) refers to an indicator that indicates statistical properties of a channel. For example, when a certain signal and another signal are in a relationship of QCL, at least one of a Doppler shift, a Doppler spread, an average delay, a delay spread, and a spatial parameter (for example, a spatial reception parameter (Spatial Rx Parameter)) of each of the plurality of different signals mentioned above can be presumed to be the same.

The QCL may include one or more types (QCL types), each of which has different parameter(s) that can be presumed to be the same. For example, the QCL may include four QCL types A to D, each of which has different parameter(s) that can be presumed to be the same.

QCL type A: QCL whose Doppler shift, Doppler spread, average delay, and delay spread can be presumed to be the same QCL type B: QCL whose Doppler shift and Doppler spread can be presumed to be the same QCL type C: QCL whose average delay and Doppler shift can be presumed to be the same QCL type D: QCL whose spatial reception parameter can be presumed to be the same A state of the transmission configuration indicator (TCI) (TCI state (TCI-state)) may indicate (may include) information related to QCL of the PDSCH (also referred to as QCL information, QCL information for the PDSCH, or the like). The QCL information for the PDSCH is, for example, information related to QCL between the PDSCH (or a DMRS port for the PDSCH) and a downlink reference signal (DL-RS (Downlink Reference Signal)), and may include, for example, at least one of information related to the DL-RS with which the QCL relationship is established (DL-RS-related information) and information indicating the QCL type described above (QCL type information).

Here, the DMRS port is an antenna port of a demodulation reference signal (DMRS). The DMRS port may be a DMRS port group including a plurality of DMRS ports, and the DMRS port in this specification may be interpreted as a DMRS port group.

The DL-RS-related information may include at least one of information indicating the DL-RS with which a QCL relationship is established and information indicating a resource of the DL-RS. For example, when a plurality of reference signal sets (RS sets) are configured for the user terminal, the DL-RS-related information may indicate a certain DL-RS to have a QCL relationship with the PDSCH (or a DMRS port for the PDSCH) among reference signals included in the RS sets, and a resource for the DL-RS.

Here, the DL-RS may be at least one of a synchronization signal (for example, at least one of a primary synchronization signal (PSS (Primary Synchronization Signal)) and a secondary synchronization signal (SSS (Secondary Synchronization Signal))), a mobility reference signal (MRS (Mobility RS)), a synchronization signal block (SSB), a channel state information-reference signal (CSI-RS, channel state information-reference signal), a demodulation reference signal (DMRS), a broadcast channel (PBCH (Physical Broadcast Channel)), a beam-specific signal, and so on, or a signal that is configured by enhancing and/or modifying the signals mentioned above (for example, a signal that is configured by modifying density and/or periodicity).

As described above, each TCI state can indicate (can include) QCL information for the PDSCH. One or more TCI states (one or more pieces of QCL information for the PDSCH) may be reported to (configured for) the user terminal from the radio base station by using higher layer signaling (for example, RRC signaling). Note that the number of TCI states configured for the user terminal may be restricted depending on a QCL type.

The DCI (DL assignment) used for scheduling of the PDSCH may include a certain field (TCI state field) indicating a TCI state (QCL information for the PDSCH). The TCI state field may be constituted with a certain number of bits (for example, 3 bits). Whether or not the TCI state field is included in the DCI may be controlled by using a report (for example, higher layer signaling) from the radio base station.

For example, when the DCI includes a TCI state field of 3 bits, the radio base station may configure a maximum of eight types of TCI states for the user terminal by using higher layer signaling in advance. A value of the TCI state field (TCI state field value) in the DCI may indicate one of the TCI states configured by using higher layer signaling in advance.

When more than eight types of TCI states are configured for the user terminal, eight or less types of TCI states may be activated (specified) by using a MAC control element (MAC CE (Medium Access Control Control Element)). The value of the TCI state field in the DCI may indicate one of the TCI states activated by using the MAC CE.

The user terminal determines QCL of the PDSCH (or a DMRS port of the PDSCH), based on the TCI state (QCL information for the PDSCH) indicated by the DCI. For example, the user terminal controls the receiving processing (for example, decoding processing, demodulation processing, and/or the like) of the PDSCH by assuming that a DMRS port (or a DMRS port group) of the PDSCH of a serving cell has a QCL relationship with the DL-RS corresponding to the TCI state that is reported using the DCI. With this configuration, accuracy of receiving the PDSCH can be enhanced.

The present embodiment will be described below in detail with reference to the drawings. Note that the following description illustrates a case used for demodulation of the PDSCH based on the TCI state. However, the present embodiment is not limited to the case. The present embodiment can be applied to operation using the TCI state (for example, receiving processing of other signals or channels). In the following description, QCL may be interpreted as QCL in the spatial domain (spatially quasi-co-located).

When the PDSCH is transmitted from a single transmission point, this case may include transmission from a coordinated cell.

(First Aspect)

In the first aspect, at least one of information related to rate matching (RM) and information related to quasi-co-location is included in certain DCI used to schedule data (for example, PDSCHs) from a plurality of transmission points, and the certain DCI is reported to the UE. The information related to rate matching included in the DCI may be referred to as a rate matching indicator (RMI). The information related to quasi-co-location included in the DCI may be referred to as a transmission configuration indicator (TCI).

Figure 2:
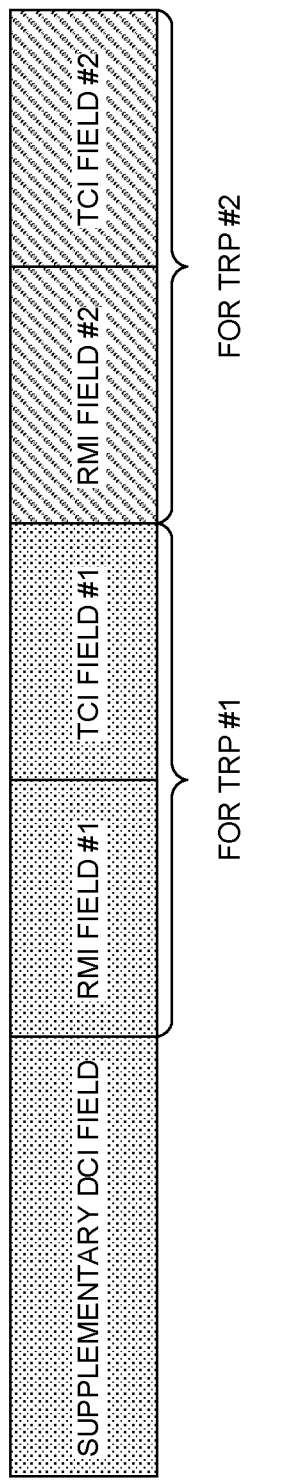
FIG. 2 is a diagram to show an example of fields included in DCI.

FIG. 2 shows an example of fields of certain DCI (DCI format) used to schedule PDSCHs (for example, non-coherent PDSCHs) transmitted from a plurality of transmission points. Note that the following description illustrates a case in which there are two transmission points as the plurality of transmission points. However, the number of transmission points is not limited to two, and may be three or more.

FIG. 2 shows a case in which fields for RMIs corresponding to each transmission point are separately configured in the DCI in order to report RMIs for the PDSCHs transmitted from different transmission points (here, TRP #1 and TRP #2). In a similar manner, FIG. 2 shows a case in which fields for TCIs corresponding to each transmission point are separately configured in the DCI in order to report TCIs for the PDSCHs transmitted from different transmission points (here, TRP #1 and TRP #2).

For example, in the DCI, RMI field #1 and TCI field #1 corresponding to the PDSCH transmitted from TRP #1, RMI field #2 and TCI field #2 corresponding to the PDSCH transmitted from TRP #2, and a supplementary field are configured. The supplementary field may be an existing field included in the DCI.

When the UE receives certain DCI, the UE performs receiving processing of the PDSCH transmitted from TRP #1, based on RMI field #1, TCI field #1, and so on included in the certain DCI. In a similar manner, the UE performs receiving processing of the PDSCH transmitted from TRP #2, based on RMI field #2, TCI field #2, and so on included in the certain DCI. By separately configuring the RMI and the TCI corresponding to each transmission point in the DCI as described above, the receiving processing of the PDSCH transmitted from each transmission point can be appropriately performed.

Alternatively, the UE may be configured such that at least one of the number of RMI fields and the number of TCI fields in the DCI can be changed and configured. For example, a single set or a plurality of sets of RMI fields included in the DCI are configured by using higher layer signaling (for example, RRC signaling and so on). In a similar manner, a single set or a plurality of sets of TCI fields included in the DCI are configured by using higher layer signaling.

The report of at least one of the RMI and the TCI (hereinafter also referred to as an RMI/TCI) may be performed for each DMRS port group (DPG), for each codeword (CW), or for each DMRS port for the PDSCH.

For example, when transmission from a plurality of transmission points is configured in each transmission unit based on the DPG by using higher layer signaling, the UE interprets that an RMI/TCI report is applied to each DMRS port group.

Alternatively, when transmission from a plurality of transmission points is configured in each transmission unit based on the CW by using higher layer signaling, the UE interprets that an RMI/TCI report is applied to each CW.

The field for the RMI/TCI configured in the DCI (for example, DCI format 1_1) may be invariably configured (is not configured to be 0 bits). Alternatively, the field for the RMI/TCI may not be configured (configured to be 0 bits) by using higher layer signaling.

For example, the DCI according to a certain Rel (for example, Rel. 15) may support the field for the RMI/TCI being configured to be 0 bits, and the DCI according to another Rel (for example, Rel. 16) may invariably configure the field for the RMI/TCI. In this case, the number of DCI bits of the DCI format of certain Rel. 15 has a value equal to the sum of the number of bits of the supplementary DCI field, the RMI field, and the TCI field. Note that the RMI field and the TCI field can be configured to be 0 by using a higher layer.

The number of DCI bits of the DCI format of certain Rel. 16 has a value equal to the sum of the number of bits of the supplementary DCI field, RMI field #1, TCI field #1, RMI field #2, and TCI field #2. By changing the number of bits configured for the DCI for each Rel as described above, the configuration of the DCI can be flexibly configured for each Rel.

<Bit Size>

RMI field #1 and RMI field #2 may have the same size. In a similar manner, TCI field #1 and TCI field #2 may have the same size. For example, the size of at least one of the RMI field and the TCI field (RMI field/TCI field) may be defined in a specification in advance.

The size of RMI field #1 and RMI field #2 may be configured by using a higher layer. For example, the size of each of RMI field #1 and RMI field #2 may be configured to be 1, 2, 3, or x (x is 0, or 4 or greater) bits by using higher layer signaling. In a similar manner, the size of each of RMI field #1 and RMI field #2 may be configured to be 1, 2, 3, or x (x is 0, or 4 or greater) bits by using higher layer signaling.

When the RMI fields are configured by using a higher layer, RMI field #1 and RMI field #2 may be configured to have the same size, or may be separately configured (for example, to have different sizes). By separately configuring the sizes of RMI field #1 and RMI field #2, the fields of the DCI can be flexibly configured based on a communication environment of each transmission point.

In a similar manner, when the TCI fields are configured by using a higher layer, TCI field #1 and TCI field #2 may be configured to have the same size, or may be separately configured (for example, to have different sizes).

To support PDSCH transmission using different CWs from different transmission points, the maximum number of transmission points that perform non-coherent (or NCJT) PDSCH transmission may be configured to be equal to the maximum number (for example, 2) of CWs.

<NCJT Transmission and Non-NCJT Transmission>

Even when PDSCH transmission from a plurality of transmission points is supported, it may be considered that there is a period in which PDSCH transmission is performed only from a single transmission point. In this case, it is desirable that the UE be capable of appropriately determining the number of transmission points from which the PDSCH is transmitted (for example, whether a single transmission point or a plurality of transmission points). In the light of this, the following will provide a description of a case in which the UE determines the number of transmission points from which the PDSCH is transmitted, based on DCI.

The UE determines the number of transmission points from which the PDSCH is transmitted (for example, whether the transmission is non-NCJT transmission or NCJT transmission), based on details (for example, bit values) of a certain field included in the DCI.

Figure 3:
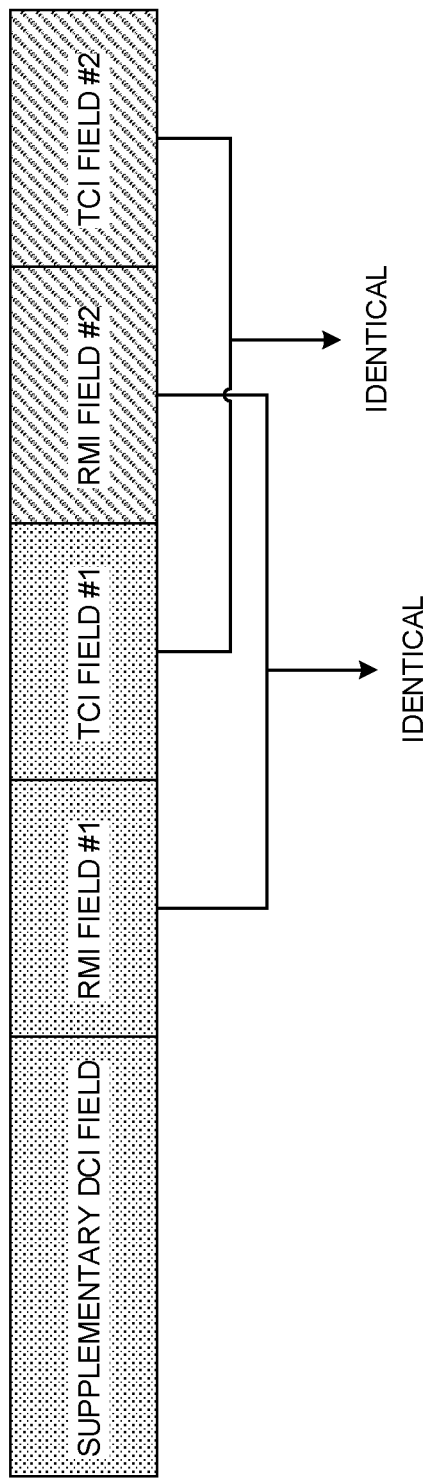
FIG. 3 is a diagram to show another example of fields included in DCI.

For example, when RMI field #1 and RMI field #2 are identical and TCI field #1 and TCI field #2 are identical, the UE determines that the PDSCH scheduled using the DCI is non-NCJT (for example, transmission from a single transmission point) (see FIG. 3). Otherwise, the UE determines that the PDSCH scheduled using the DCI is NCJT (for example, transmission from a plurality of transmission points).

When the UE determines that the PDSCH transmission is NCJT, the UE applies RMI field #1 and TCI field #1 to CW #1 or DPG #1, and applies RMI field #2 and TCI field #2 to CW #2 or DPG #2.

Alternatively, when the PDSCH transmission is non-NCJT, a certain field (for example, RMI field #2 and TCI field #2) is configured to have a specific bit value. When the bit value of each of RMI field #2 and TCI field #2 included in the DCI has a specific value (for example, 000 . . . ), the UE performs receiving processing, based on RMI field #1 and TCI field #1, regardless of the number of configured CWs and so on.

Otherwise, the UE determines that the PDSCH scheduled using the DCI is NCJT (for example, transmission from a plurality of transmission points). In this case, the UE may apply RMI field #1 and TCI field #1 to CW #1 or DPG #1, and may apply RMI field #2 and TCI field #2 to CW #2 or DPG #2.

Figure 4:
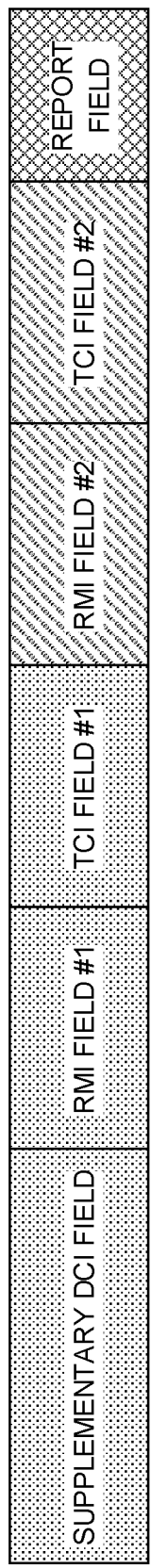
FIG. 4 is a diagram to show another example of fields included in DCI.

Alternatively, a field for reporting information related to the number of transmission points (for example, whether the transmission is non-NCJT transmission or NCJT transmission) may be configured in the DCI (see FIG. 4). For example, when the bit value of such a report field has a certain value (for example, 0), the UE determines that the PDSCH scheduled using the DCI is NCJT (for example, transmission from a plurality of transmission points).

When the bit value of the report field has another value (for example, 1), the UE determines that the PDSCH scheduled using the DCI is non-NCJT (for example, transmission from a single transmission point). For example, the UE performs receiving processing, based on RMI field #1 and TCI field #1. In this case, RMI field #2 and TCI field #2 need not be used for the receiving processing, and may thus be used for other purposes.

By providing the RMI field/TCI field in the DCI (for example, DCI format 1_1) as described above, PDSCH transmission from a single transmission point or PDSCH transmission from a plurality of transmission points can be appropriately received by using the DCI. PDSCH transmission from a symbol transmission point and PDSCH transmission from a plurality of transmission points can be dynamically switched based on the DCI to perform scheduling.

At the same time, the DCI in which the RMI field/TCI field is configured (also referred to as enhanced DCI or an enhanced DCI format) includes a larger number of bits than the DCI of the existing systems. For example, fallback DCI and non-fallback DCI (enhanced DCI) have different numbers of DCI bits.

In the enhanced DCI (for example, enhanced DCI format 1_1) as well, various numbers of DCI bits are configured depending on a communication condition. For example, it may be considered that different numbers of bits of the RMI field/TCI field are configured in a frequency band of X GHz or lower and a frequency band higher than X GHz. X may be 3 or 6. Note that the number of DCI bits used in each frequency band can be configured by using higher layer signaling and so on.

In this manner, when the enhanced DCI is introduced, various numbers of DCI bits are configured. At the same time, from the point of view of preventing an increase in the number of times of blind decoding, it is preferable that bit sizes of different DCI formats be arranged to match each other (padding bits be added, for example). For this reason, even when the enhanced DCI is introduced, to prevent an increase in the number of times of blind decoding, the bit sizes of pieces of DCI may be adjusted depending on a communication state so that the bit sizes of the enhanced DCI and non-enhanced DCI match each other.

(Second Aspect)

In the second aspect, when data transmission is performed from a plurality of transmission points, at least one of parameter candidates related to rate matching (RM) and parameter candidates related to quasi-co-location (QCL) is configured, and a specific candidate to be applied to receiving processing is reported to the UE by using DCI.

The base station configures a plurality of parameter sets related to RM and a plurality of parameter sets related to QCL (or TCI) by using at least one of higher layer signaling and MAC signaling. Then, the base station reports a specific parameter set out of the plurality of parameter sets to the UE by using DCI. The base station may report whether PDSCH transmission is transmission from a single transmission point or transmission from a plurality of transmission points to the UE by using DCI.

<Rate Matching>

FIGS. 5A and 5B are each a diagram to show an example of a table that defines a relationship between a rate matching pattern (also referred to as RM pattern setting) configured by using higher layer signaling and a state of DCI (for example, a bit value). In FIG. 5A, parameter sets of RM for the PDSCH transmitted from each transmission point are separately configured for bit values of respective pieces of DCI. Note that the table shown in FIG. 5A is merely an example, and configured details are not limited to those described above.

For example, RM pattern #1 for at least one of CW 1 and DPG 1 (CW 1/DPG 1) and RM pattern #2 for CW 2/DPG 2 are configured for the bit value "00" of the DCI. Note that CW 1/DPG 1 may correspond to the PDSCH transmitted from the first transmission point, and CW 2/DPG 2 may correspond to the PDSCH transmitted from the second transmission point.

In a similar manner, RM pattern #3 for CW 1/DPG 1 and RM pattern #4 for CW 2/DPG 2 are configured for the bit value "01" of the DCI, RM pattern #5 for CW 1/DPG 1 and RM pattern #6 for CW 2/DPG 2 are configured for the bit value "10" of the DCI, and RM pattern #7 for CW 1/DPG 1 and RM pattern #8 for CW 2/DPG 2 are configured for the bit value "11" of the DCI.

For example, when transmission from a plurality of transmission points is configured in each unit based on the CW (or based on the DPG), the UE controls receiving processing by applying the report of the RM pattern to each CW (or each DPG).

When the PDSCH is transmitted from a single transmission point (for example, in a case of non-NCJT), the RM pattern configured for each DCI bit may be configured to have the same details. For example, when the PDSCH is transmitted from a single transmission point, the base station configures RM patterns #1 and #2 so as to have the same details. In a similar manner, the base station configures RM patterns #3 and #4, RM patterns #5 and #6, and RM patterns #7 and #8 so as to have the same details.

The UE may determine whether the PDSCH transmission is transmission from a single transmission point or transmission from a plurality of transmission points, based on a configured RM pattern set that is configured corresponding to each of the DCI bits.

Alternatively, a single RM pattern may be configured for some of the bit values out of the plurality of bit values of the DCI, and a plurality of RM patterns may be configured for the other bit values (see FIG. 5B). In FIG. 5B, RM pattern #1 is configured for the bit value "00" of the DCI, and RM pattern #2 is configured for the bit value "01" of the DCI. Note that a single RM pattern may be configured for each of the bit values regardless of the number (one or two) of applied CWs.

In contrast, RM pattern #3 for CW 1/DPG 1 and RM pattern #4 for CW 2/DPG 2 are configured for the bit value "10" of the DCI, and RM pattern #5 for CW 1/DPG 1 and RM pattern #6 for CW 2/DPG 2 are configured for the bit value "11" of the DCI.

When the PDSCH is transmitted from a single transmission point (for example, in a case of non-NCJT), the base station reports "00" or "01" to the UE as the bit value of the DCI. When the bit value of the received DCI is "00" or "01", the UE performs receiving processing by assuming that the PDSCH transmission is transmitted from a single transmission point.

When the PDSCH is transmitted from a plurality of transmission points (for example, in a case of NCJT), the base station reports "10" or "11" to the UE as the bit value of the DCI. When the bit value of the received DCI is "10" or "11", the UE performs receiving processing by assuming that the PDSCH transmission is transmitted from a plurality of transmission points.

FIGS. 5A and 5B described above each show a case in which the RM patterns are defined using 2 bits. However, this is not restrictive. The RM patterns may be reported to the UE by using 3 bits or more. FIG. 6 shows an example of a table that defines the RM patterns by using 3 bits.

As an example, the description herein assumes a case in which there are three measurement targets (sizes of a measurement set), and transmission from a plurality of transmission points is configured in each unit of transmission based on the DPG. A case in which the size of the measurement set is 3 corresponds to a case in which, for example, three beams (beam 1, beam 2, and beam 3) are used. In this case, it may be assumed that transmission based on DPG 1 corresponds to beam 1, transmission based on DPG 2 corresponds to beam 2, and transmission based on DPG 3 corresponds to beam 3.

When three beams are applied (for example, the measurement set size is 3), as shown in FIG. 6, one or more RM patterns may be configured for each bit of the DCI. In FIG. 6, RM patterns corresponding to beam 1/DPG 1 are defined for the bit value "000" of the DCI. In a similar manner, RM patterns corresponding to beam 2/DPG 2 are defined for the bit value "001" of the DCI, and RM patterns corresponding to beam 3/DPG 3 are defined for the bit value "010" of the DCI.

In contrast, an RM pattern corresponding to beam 1/DPG 1 and an RM pattern corresponding to beam 2/DPG 2 are defined for the bit value "011" of the DCI. In a similar manner, an RM pattern corresponding to beam 1/DPG 1 and an RM pattern corresponding to beam 3/DPG 3 are defined for the bit value "100" of the DCI, and an RM pattern corresponding to beam 2/DPG 2 and an RM pattern corresponding to beam 3/DPG 3 are defined for the bit value "101" of the DCI.

The base station determines the bit value to be reported using the DCI, based on the transmission point(s) from which the PDSCH is transmitted. For example, when the PDSCH is transmitted from a single transmission point (beam 1/DPG 1), "000" is reported to the UE as the bit value of the DCI. When the bit value of the received DCI is "000", the UE performs receiving processing by assuming that the PDSCH transmission is transmitted from a single transmission point (beam 1/DPG 1).

When the PDSCH is transmitted from a plurality of transmission points (for example, beam 1/DPG 1 and beam 2/DPG 2), the base station reports "011" to the UE as the bit value of the DCI. When the bit value of the received DCI is "011", the UE performs receiving processing by assuming that the PDSCH transmission is transmitted from a plurality of transmission points (for example, beam 1/DPG 1 and beam 2/DPG 2).

Note that FIG. 6 shows a case in which the same RM pattern is defined for each of the bit values "000", "001", and "010" of the DCI. However, the number of fixed RM patterns may be only one.

FIG. 6 shows a case in which a single type of RM pattern is configured for each transmission point. However, this is not restrictive. A plurality of RM patterns may be defined for each beam/DPG. FIG. 7 shows an example of a table of a case in which two types of RM patterns are defined for each beam/DPG.

By providing a plurality of RM patterns for the PDSCH from each transmission point as described above, transmission and reception of the PDSCH to and from each transmission point can be flexibly controlled.

<TCI>

Figure 8B:
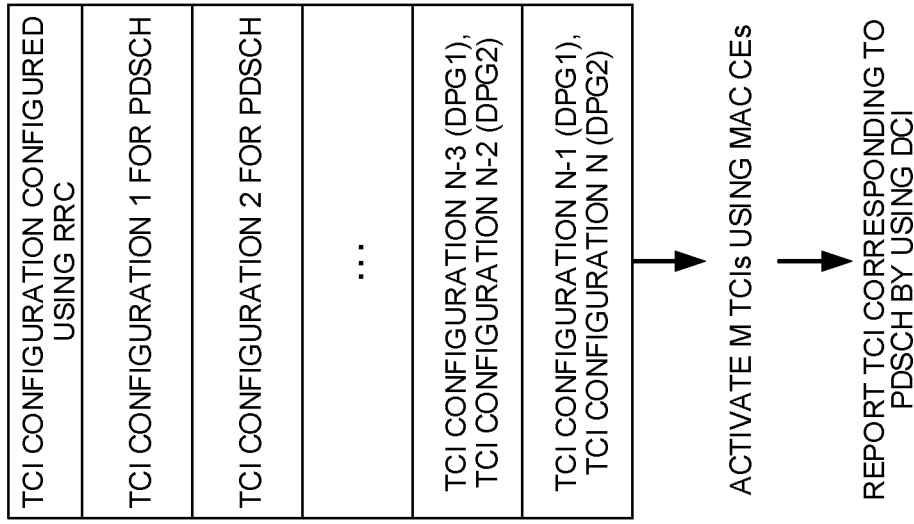
FIG. 8A and FIG. 8B are each a diagram to show an example of TCI configurations configured using RRC.
Figure 8A:
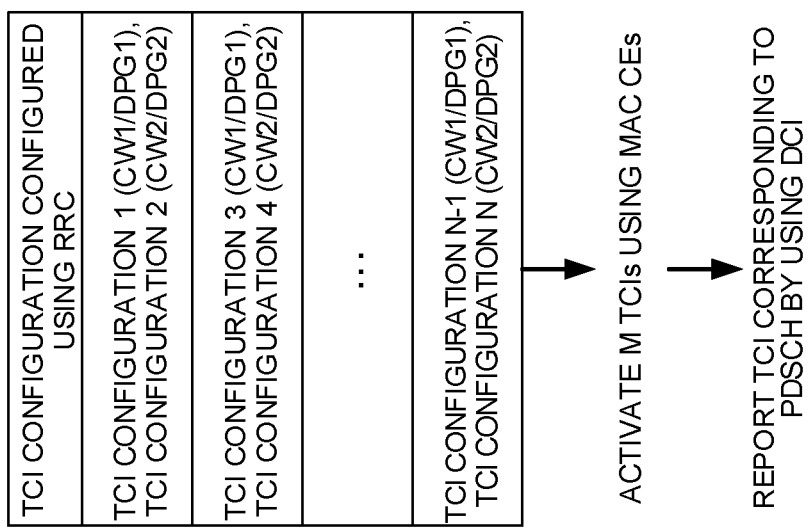

FIGS. 8A and 8B are each a diagram to show an example of TCI configurations that are configured by using higher layer signaling. In FIG. 8A, parameter sets of TCI for the PDSCH transmitted from each transmission point are separately configured. Note that the table shown in FIG. 8A is merely an example, and configured details are not limited to those described above.

Here, TCI configuration 1 for CW 1/DPG 1 corresponding to TRP #1 and TCI configuration 2 for CW 2/DPG 2 corresponding to TRP #2 are configured in combination. In a similar manner, TCI configuration 3 for CW 1/DPG 1 and TCI configuration 4 for CW 2/DPG 2 are configured in combination, and TCI configuration N-1 for CW 1/DPG 1 and TCI configuration N for CW 2/DPG 2 are configured in combination.

The base station may report TCI configurations to be activated out of the TCI configurations configured by using higher layer signaling (for example, a set of combinations of TCIs corresponding to a plurality of transmission points) to the UE by using MAC signaling (MAC CEs). The number of TCI configurations to be activated by using MAC signaling may be M (for example, M=8).

Further, the base station reports a specific TCI configuration out of the TCI configurations activated by using MAC signaling to the UE by using DCI. When transmission from a plurality of transmission points is configured in each transmission unit based on the CW (or based on the DPG or based on the DMRS port), the UE controls receiving processing by applying the report of the RM pattern to each CW (or each DPG or each DMRS port).

When the PDSCH is transmitted from a single transmission point (for example, in a case of non-NCJT), the RM pattern configured for each DCI bit may be configured to have the same details. For example, when the PDSCH is transmitted from a single transmission point, the base station configures TCI configuration 1 for CW 1/DPG 1 and TCI configuration 2 for CW 2/DPG 2 so as to have the same details. In a similar manner, the base station configures TCI configuration N-1 for CW 1/DPG 1 and TCI configuration N for CW 2/DPG 2 so as to have the same details.

The UE may determine whether the PDSCH transmission is transmission from a single transmission point or transmission from a plurality of transmission points, based on a configured TCI configuration set that is configured corresponding to each of the DCI bits.

Alternatively, a single TCI configuration may be configured for some of the bit values out of the plurality of bit values of the DCI (or report candidates configured using RRC), and a plurality of TCI configurations may be configured for the other bit values (see FIG. 8B). In FIG. 8B, among pieces of candidate information to be reported to the UE by using the DCI, piece(s) of candidate information including a single TCI configuration and piece(s) of candidate information including a plurality of TCI configurations for different transmission points (for example, different DPGs) may be configured.

The maximum number (N) of pieces of candidate information that can be configured by using higher layer signaling may be equal to or larger than the number in the existing systems.

FIGS. 8A and 8B described above each show a case in which the TCI configurations are reported by using 2 bits of the DCI. However, this is not restrictive. The TCI configurations may be reported to the UE by using 3 bits or more. FIG. 9 shows an example of a table that defines the TCI configurations by using 3 bits.

As an example, the description herein assumes a case in which there are two measurement targets (sizes of a measurement set), and transmission from a plurality of transmission points is configured in each unit of transmission based on the DPG. A case in which the size of the measurement set is 2 corresponds to a case in which, for example, three beams (beam 1, beam 2, and beam 3) are used. In this case, it may be assumed that transmission based on DPG 1 corresponds to beam 1, and transmission based on DPG 2 corresponds to beam 2.

When two beams are applied (for example, the measurement set size is 2), as shown in FIG. 9, one or more TCI configurations may be configured for each bit of the DCI. In FIG. 9, TCI configurations (for example, TCI configuration 1) corresponding to beam 1/DPG 1 are defined for the bit value "000" of the DCI. In a similar manner, TCI configurations (for example, TCI configuration 2) corresponding to beam 1/DPG 1 are defined for the bit value "001" of the DCI, and TCI configurations (for example, TCI configuration 3) corresponding to beam 1/DPG 1 are defined for the bit value "010" of the DCI.

TCI configurations (for example, TCI configuration 4) corresponding to beam 2/DPG 2 are defined for the bit value "011" of the DCI. In a similar manner, TCI configurations (for example, TCI configuration 5) corresponding to beam 2/DPG 2 are defined for the bit value "100" of the DCI, and TCI configurations (for example, TCI configuration 6) corresponding to beam 2/DPG 2 are defined for the bit value "101" of the DCI.

In contrast, a TCI configuration (for example, TCI configuration 1) corresponding to beam 1/DPG 1 and a TCI configuration (for example, TCI configuration 4) corresponding to beam 2/DPG 2 are defined for the bit value "110" of the DCI. In a similar manner, a TCI configuration (for example, TCI configuration 2) corresponding to beam 1/DPG 1 and a TCI configuration (for example, TCI configuration 5) corresponding to beam 2/DPG 2 are defined for the bit value "111" of the DCI.

The base station determines the bit value to be reported using the DCI, based on the transmission point(s) from which the PDSCH is transmitted. For example, when the PDSCH corresponding to TCI configuration 1 is transmitted from a single transmission point (beam 1/DPG 1), "000" is reported to the UE as the bit value of the DCI. When the bit value of the received DCI is "000", the UE performs receiving processing by assuming that the PDSCH transmission is transmitted from a single transmission point (beam 1/DPG 1) and corresponds to TCI configuration 1.

When the PDSCH is transmitted from a plurality of transmission points (for example, beam 1/DPG 1 (corresponding to TCI configuration 1) and beam 2/DPG 2 (corresponding to TCI configuration 4)), the base station reports "110" to the UE as the bit value of the DCI. When the bit value of the received DCI is "110", the UE performs receiving processing by assuming that the PDSCH transmission is transmitted from a plurality of transmission points (for example, beam 1/DPG 1 and beam 2/DPG 2) and corresponds to TCI configuration 1 and TCI configuration 4.

By providing a plurality of TCI configurations for the PDSCH from each transmission point as described above, transmission and reception of the PDSCH to and from each transmission point can be flexibly controlled based on a communication state.

(Third Aspect)

In the third aspect, at least one of a resource in the time domain and a resource in the frequency domain corresponding to each PDSCH is reported to the UE by using certain DCI used to schedule data (for example, PDSCHs) from a plurality of transmission points.

Figure 10A:
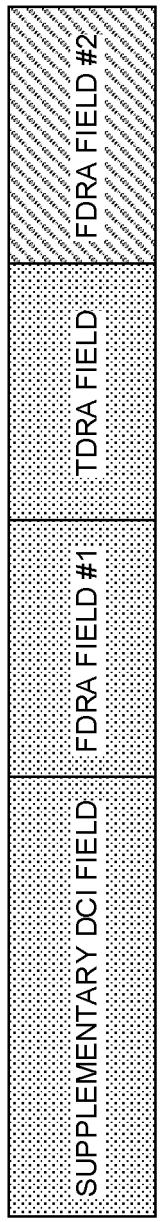
FIG. 10A to FIG. 10C are each a diagram to show another example of fields included in DCI.
Figure 10B:
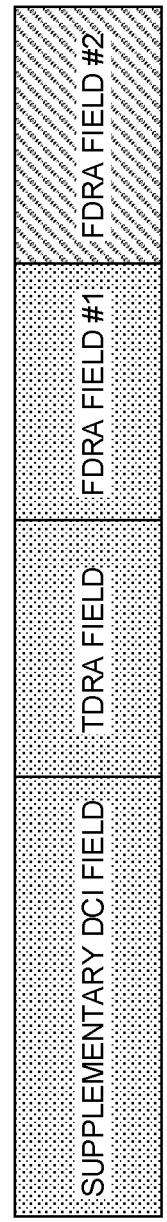
Figure 10C:
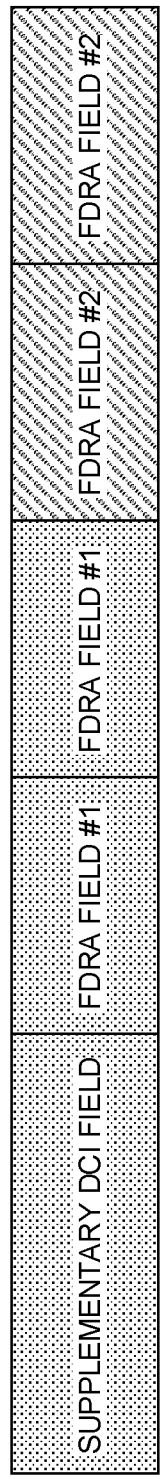

FIGS. 10A to 10C each show an example of fields of certain DCI (DCI format) used to schedule PDSCHs (for example, non-coherent PDSCHs) transmitted from a plurality of transmission points. Note that the following description illustrates a case in which there are two transmission points as the plurality of transmission points. However, the number of transmission points is not limited to two, and may be three or more.

FIGS. 10A to 10C each show a case in which at least one of a resource assignment field in the frequency domain and a resource assignment field in the time domain corresponding to each transmission point is separately configured in the DCI in order to report resource assignment for the PDSCHs transmitted from different transmission points (here, TRP #1 and TRP #2).

FIG. 10A shows a case in which a frequency resource assignment (FDRA (Frequency domain resource assignment)) field corresponding to each transmission point is separately configured. FIG. 10B shows a case in which time resource assignment (TDRA (Time domain resource assignment)) field corresponding to each transmission point is separately configured. FIG. 10C shows a case in which FDRA fields and TDRA fields corresponding to each transmission point are separately configured.

The use of the DCI of FIG. 10A allows for appropriate control of scheduling in a case in which the PDSCHs transmitted from a plurality of transmission points do not overlap each other in the frequency resource. The use of the DCI of FIG. 10B allows for appropriate control of scheduling in a case in which the PDSCHs transmitted from a plurality of transmission points do not overlap each other in the time resource. The use of the DCI of FIG. 10C allows for appropriate control of scheduling in a case in which the PDSCHs transmitted from a plurality of transmission points do not overlap each other in the frequency resource and the time The supplementary field included in the DCI may be an existing field included in the DCI, or may include at least one of the RMI field and the TCI field illustrated in the first aspect.

When the UE receives certain DCI, the UE performs receiving processing of the PDSCH transmitted from TRP #1, based on the FDRA, the TDRA, and so on included in the certain DCI. By separately configuring at least one of the FDRA and the TDRA corresponding to each transmission point in the DCI, the receiving processing of the PDSCH transmitted from each transmission point can be appropriately performed.

For example, when the FDRA corresponding to each transmission point is separately configured (FIGS. 10A and 10C), the UE determines the frequency resource assignment corresponding to each transmission point, based on the FDRA. When FDRA #1 corresponding to the first transmission point and FDRA #2 corresponding to the second transmission point are the same, it is determined that the plurality of PDSCHs transmitted from respective transmission points are assigned to the same frequency resource.

When the TDRA corresponding to each transmission point is separately configured (FIGS. 10B and 10C), the UE determines the frequency resource assignment corresponding to each transmission point, based on the TDRA. When TDRA #1 corresponding to the first transmission point and TDRA #2 corresponding to the second transmission point are the same, it is determined that the plurality of PDSCHs transmitted from respective transmission points are assigned to the same time resource.

Alternatively, at least one of the number of FDRA fields and the number of TDRA fields to be configured in the DCI may be changed and configured. For example, a single set or a plurality of sets of FDRA fields included in the DCI are configured by using higher layer signaling (for example, RRC signaling and so on). In a similar manner, a single set or a plurality of sets of TDRA fields included in the DCI are configured by using higher layer signaling.

The report of at least one of the FDRA and the TDRA may be performed for each DMRS port group (DPG), for each codeword (CW), or for each DMRS port for the PDSCH.

For example, when transmission from a plurality of transmission points is configured in transmission units based on the DPG by using higher layer signaling, the UE interprets that an FDRA/TDRA report is applied to each DMRS port group.

Alternatively, when transmission from a plurality of transmission points is configured in transmission units based on the CW by using higher layer signaling, the UE interprets that an FDRA/TDRA report is applied to each CW.

Figure 11:
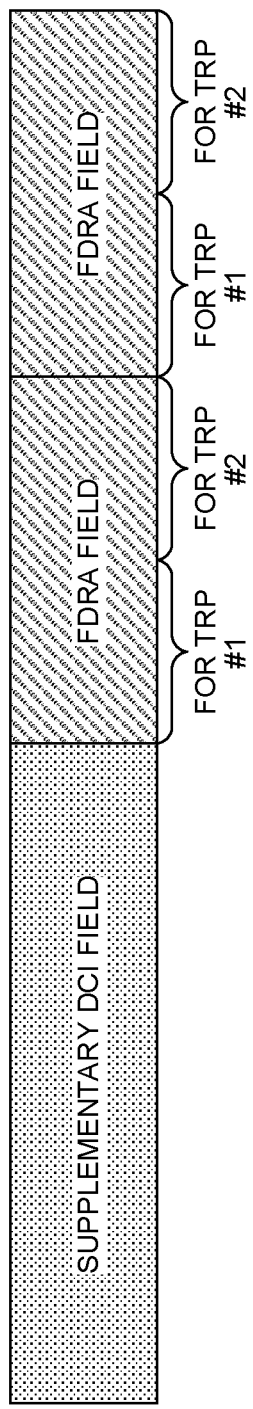
FIG. 11 is a diagram to show another example of fields included in DCI.

Alternatively, frequency domain assignment of the PDSCHs from a plurality of transmission points may be reported to the UE by using a common FDRA field (for example, a single FDRA field) (see FIG. 11). In a similar manner, time domain assignment of the PDSCHs from a plurality of transmission points may be reported to the UE by using a common TDRA field (for example, a single TDRA field).

In this case, whether the FDRA field included in the DCI is used for the frequency resource assignment of the PDSCH transmitted from a single transmission point or is used for the frequency resource assignment of the PDSCHs transmitted from a plurality of transmission points may be reported to the UE by using higher layer signaling. In a similar manner, whether the TDRA field included in the DCI is used for the time resource assignment of the PDSCH transmitted from a single transmission point or is used for the time resource assignment of the PDSCHs transmitted from a plurality of transmission points may be reported to the UE by using higher layer signaling. The plurality of transmission points may be interpreted as a plurality of CWs, a plurality of DMRS port groups, or a plurality of DMRS ports.

When the FDRA field is used for the report of the frequency resource assignment of the PDSCHs transmitted from a plurality of (for example, two) transmission points, the frequency resource for the PDSCH of each transmission point is specified based on the FDRA field. For example, a bit region included in the FDRA field is divided into two, and the frequency resource assignment of the PDSCH of the first transmission point is reported by using bits in the first half of the region, and the frequency resource assignment of the PDSCH of the second transmission point is reported by using bits in the second half of the region.

In this case, scheduling granularity in the frequency direction is coarser; however, the frequency resource assignment of the PDSCHs (for example, two CWs or two DMRS port groups) from a plurality of transmission points can be reported to the UE by using a single FDRA field.

When the TDRA field is used for the report of the time resource assignment of the PDSCHs transmitted from a plurality of (for example, two) transmission points, the time resource for the PDSCH of each transmission point is specified based on the TDRA field. For example, a bit region included in the TDRA field is divided into two, and the time resource assignment of the PDSCH of the first transmission point is reported by using bits in the first half of the region, and the time resource assignment of the PDSCH of the second transmission point is reported by using bits in the second half of the region.

In this case, flexibility of scheduling in the time direction is restricted; however, the time resource assignment of the PDSCHs (for example, two CWs or two DMRS port groups) from a plurality of transmission points can be reported to the UE by using a single TDRA field.

(Fourth Aspect)

In the fourth aspect, interpretation of certain information included in DCI used to schedule data (for example, PDSCHs) from a plurality of transmission points is changed based on the number of transmission points of the PDSCHs (for example, whether there is a single transmission point or there are a plurality of transmission points). The following description takes a modulation and coding scheme (MCS), a new data indicator (NDI (New Date Indicator)), and a redundancy version (RV) as examples of the certain information included in the DCI. However, the certain information is not limited to those described above.

When the UE determines that the PDSCH is transmitted from a single transmission point based on DCI and so on, the UE performs receiving processing by interpreting the MCS, the NDI, and the RV corresponding to each of transport blocks (for example, TB 1 and TB 2) in a manner similar to the existing systems.

In contrast, when the UE determines that the PDSCHs are transmitted from a plurality of transmission points based on DCI and so on, the UE performs receiving processing by interpreting that the MCS, the NDI, and the RV corresponding to TB 1 are supposed to be a report for the first transmission point (for example, the first CW or the first DMRS port group). The UE performs receiving processing by interpreting that the MCS, the NDI, and the RV corresponding to TB 2 are supposed to be a report for the second transmission point (for example, the second CW or the second DMRS port group).

By changing the interpretation of certain information of the DCI based on the number of transmission points of PDSCH transmission that is scheduled using the DCI as described above, a common DCI configuration can be used regardless of the number of transmission points.

(Fifth Aspect)

In the fifth aspect, when data (for example, PDSCH) transmission from a plurality of transmission points is performed using certain DCI, certain UE capability information (UE capability) is defined.

For example, the following UE capability information may be defined. The UE capability information is reported from the UE to a network (for example, the base station).

For example, the UE reports, to the base station, whether or not DL transmission using a plurality of transmission points is supported.

The UE may report, to the base station, the maximum number of simultaneous DL transmissions supported by the UE regarding DL transmission using a plurality of transmission points.

For example, when the maximum number of DL simultaneous transmissions supported by the UE is N, the base station configures the number of RMI fields and TCI fields configured in the DCI to N or less (first aspect). The base station configures the number of parameter sets related to RM and TCI corresponding to the bit values of respective pieces of DCI to N or less (second aspect). Note that N may be 2, 3, or another value.

The UE may report, to the base station, the maximum number of codewords supported by the UE regarding DL transmission using a plurality of transmission points.

The UE may report, to the base station, at least one of the maximum number of the number of layers supported by the UE and the maximum value of the number of layers for each codeword regarding DL transmission using a plurality of transmission points.

The UE may report, to the base station, whether the PDSCHs transmitted from different transmission points support at least one of different resource assignments in the frequency domain and the same resource assignment in the frequency domain.

The UE may report, to the base station, whether the PDSCHs transmitted from different transmission points support at least one of different resource assignments in the time domain and the same resource assignment in the time domain.

(Radio Communication System)

Hereinafter, a structure of a radio communication system according to the present embodiment will be described. In the radio communication system, communication is performed by using at least one combination of the plurality of aspects described above.

Figure 12:
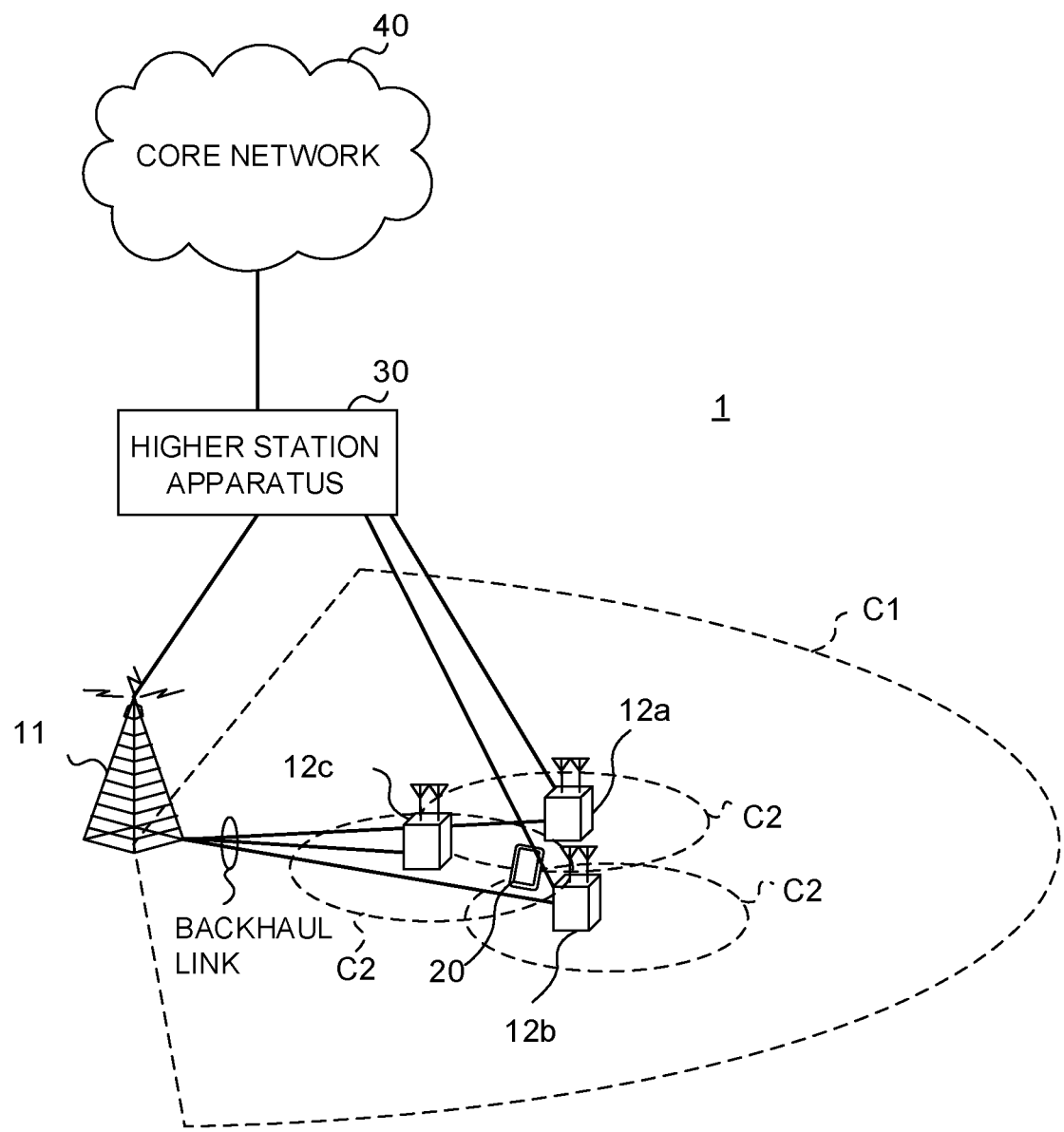
FIG. 12 is a diagram to show an example of a schematic structure of a radio communication system according to the present embodiment.

FIG. 12 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE- Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs) (for example, five or less CCs or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a filter processing, a windowing processing, and so on.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel)), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of a downlink control channel (a PDCCH (Physical Downlink Control Channel) and/or an EPDCCH (Enhanced Physical Downlink Control Channel)), a PCFICH (Physical Control Format Indicator Channel), and a PHICH (Physical Hybrid-ARQ Indicator Channel). Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio link quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 13:
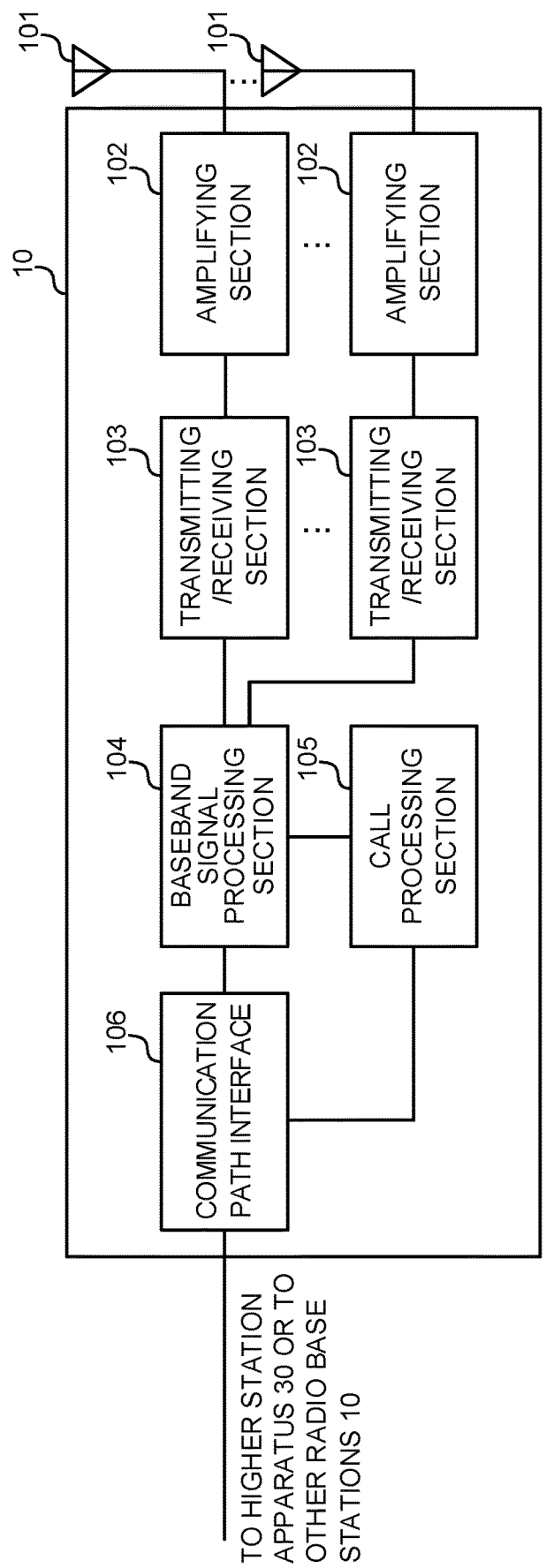
FIG. 13 is a diagram to show an example of an overall structure of a radio base station according to the present embodiment.

FIG. 13 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (configuring, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Note that the transmitting/receiving sections 103 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present invention pertains. The transmitting/receiving antennas 101 can be constituted with array antennas, for example. The transmitting/receiving sections 103 are configured to be capable of employing single BF and multi-BF.

The transmitting/receiving sections 103 may transmit signals by using transmit beams, and may receive signals by using receive beams. The transmitting/receiving sections 103 may transmit and/or receive signals by using certain beams that are determined by the control section 301.

Further, each of the transmitting/receiving sections 103 transmits a downlink (DL) signal (including at least one of a DL data signal (downlink shared channel), a DL control signal (downlink control channel), and a DL reference signal) to the user terminal 20, and receives an uplink (UL) signal (including at least one of a UL data signal, a UL control signal, and a UL reference signal) from the user terminal 20.

Each of the transmitting/receiving sections 103 transmits certain downlink control information used to schedule the PDSCH transmitted from a plurality of transmission points. Each of the transmitting/receiving sections 103 may include at least one of information related to rate matching (for example, the RMI), information related to quasi-co-location (for example, the TCI), information related to resource assignment in the frequency domain (FDRA), and information related to resource assignment in the time domain (FDRA) of the PDSCH transmitted from the plurality of transmission points in the certain downlink control information to transmit the certain downlink control information.

Figure 14:
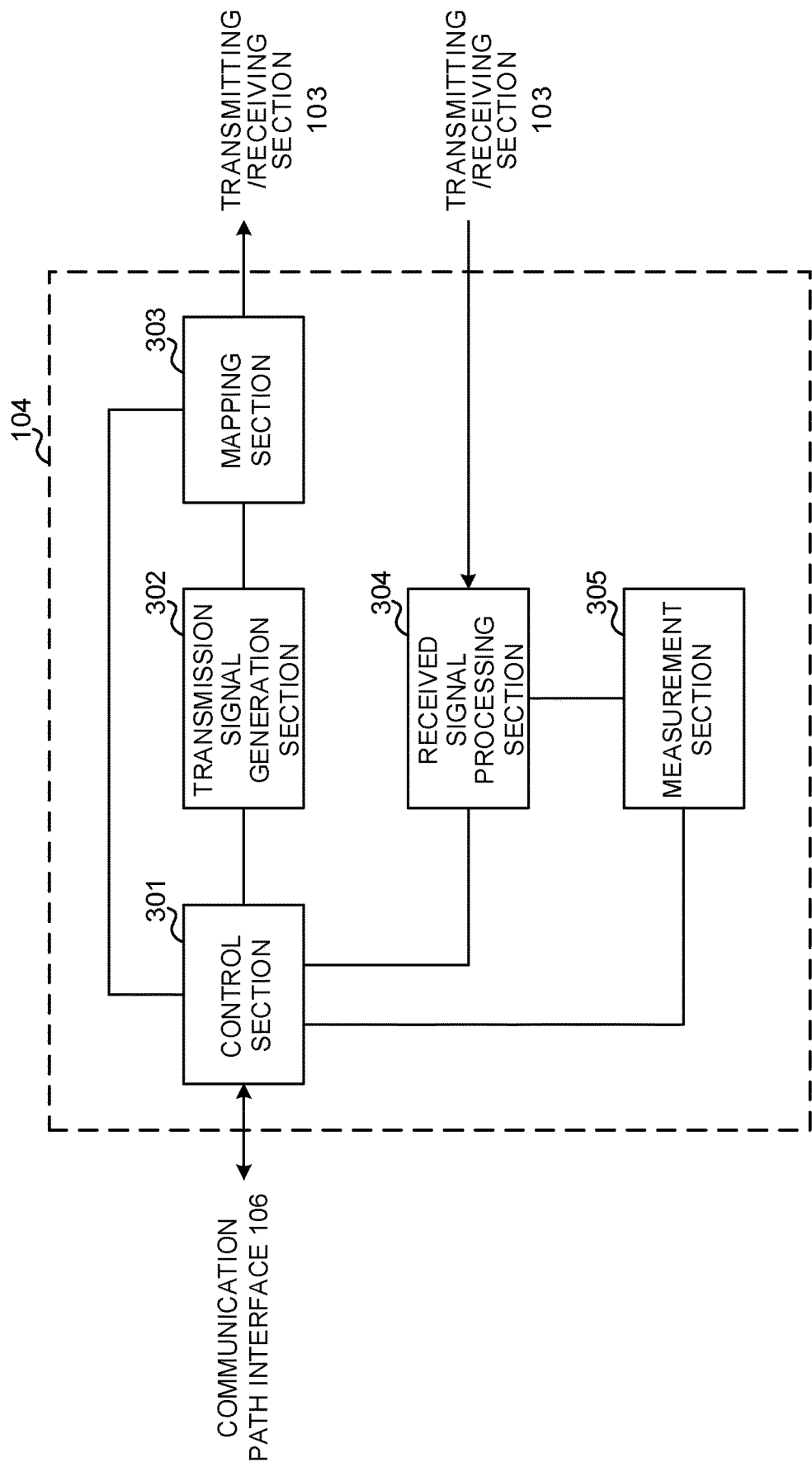
FIG. 14 is a diagram to show an example of a functional structure of the radio base station according to the present embodiment.

FIG. 14 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH, transmission confirmation information, and so on). Based on the results of determining necessity or not of retransmission control to the uplink data signal, or the like, the control section 301 controls generation of a downlink control signal, a downlink data signal, and so on.

The control section 301 controls scheduling of at least one of a DL signal and a DL channel (for example, a PDSCH) transmitted from a plurality of transmission points.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, and so on are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), propagation path information (for example, CSI), and so on. The measurement results may be output to the control section 301.

<User Terminal>

Figure 15:
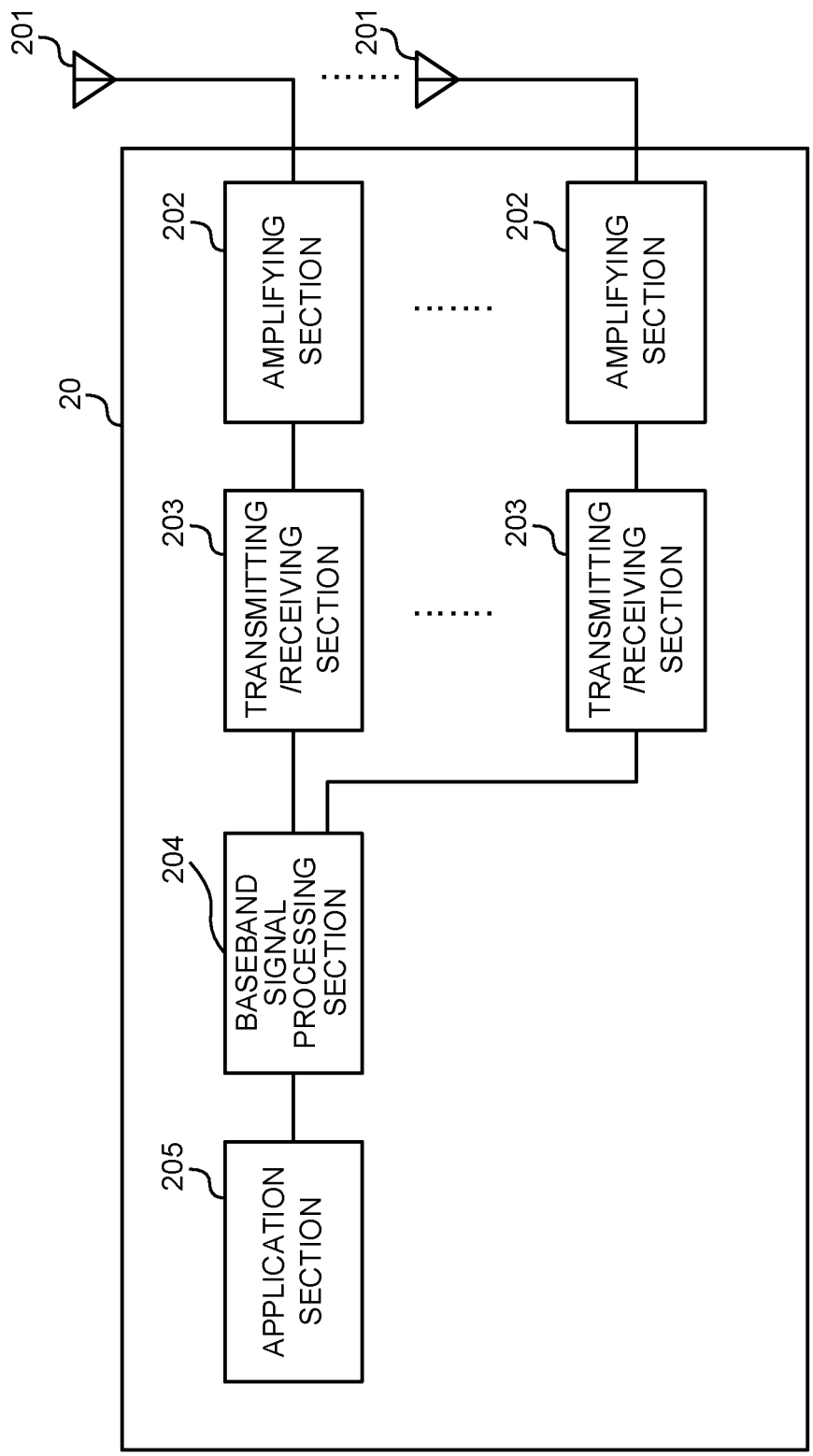
FIG. 15 is a diagram to show an example of an overall structure of a user terminal according to the present embodiment.

FIG. 15 is a diagram to show an example of an overall structure of a user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving sections 203 may further include analog beamforming sections that perform analog beamforming. The analog beamforming sections can be constituted with analog beamforming circuits (for example, phase shifters and phase shift circuits) or analog beamforming apparatus (for example, phase shifting apparatus) that can be described based on general understanding of the technical field to which the present invention pertains. The transmitting/receiving antennas 201 can be constituted with array antennas, for example. The transmitting/receiving sections 203 are configured to be capable of employing single BF and multi-BF.

The transmitting/receiving sections 203 may transmit signals by using transmit beams, and may receive signals by using receive beams. The transmitting/receiving sections 203 may transmit and/or receive signals by using certain beams that are determined by the control section 401.

Each of the transmitting/receiving sections 203 receives a downlink (DL) signal (including at least one of a DL data signal (downlink shared channel), a DL control signal (downlink control channel), and a DL reference signal) from the radio base station 10, and transmits an uplink (UL) signal (including at least one of a UL data signal, a UL control signal, and a UL reference signal) to the radio base station 10.

Each of the transmitting/receiving sections 203 receives a physical shared channel transmitted from a plurality of transmission points, based on certain downlink control information. Each of the transmitting/receiving sections 203 may receive at least one of information related to rate matching (for example, the RMI), information related to quasi-co-location (for example, the TCI), information related to resource assignment in the frequency domain (FDRA), and information related to resource assignment in the time domain (FDRA) of the PDSCH transmitted from the plurality of transmission points by using the certain downlink control information.

Figure 16:
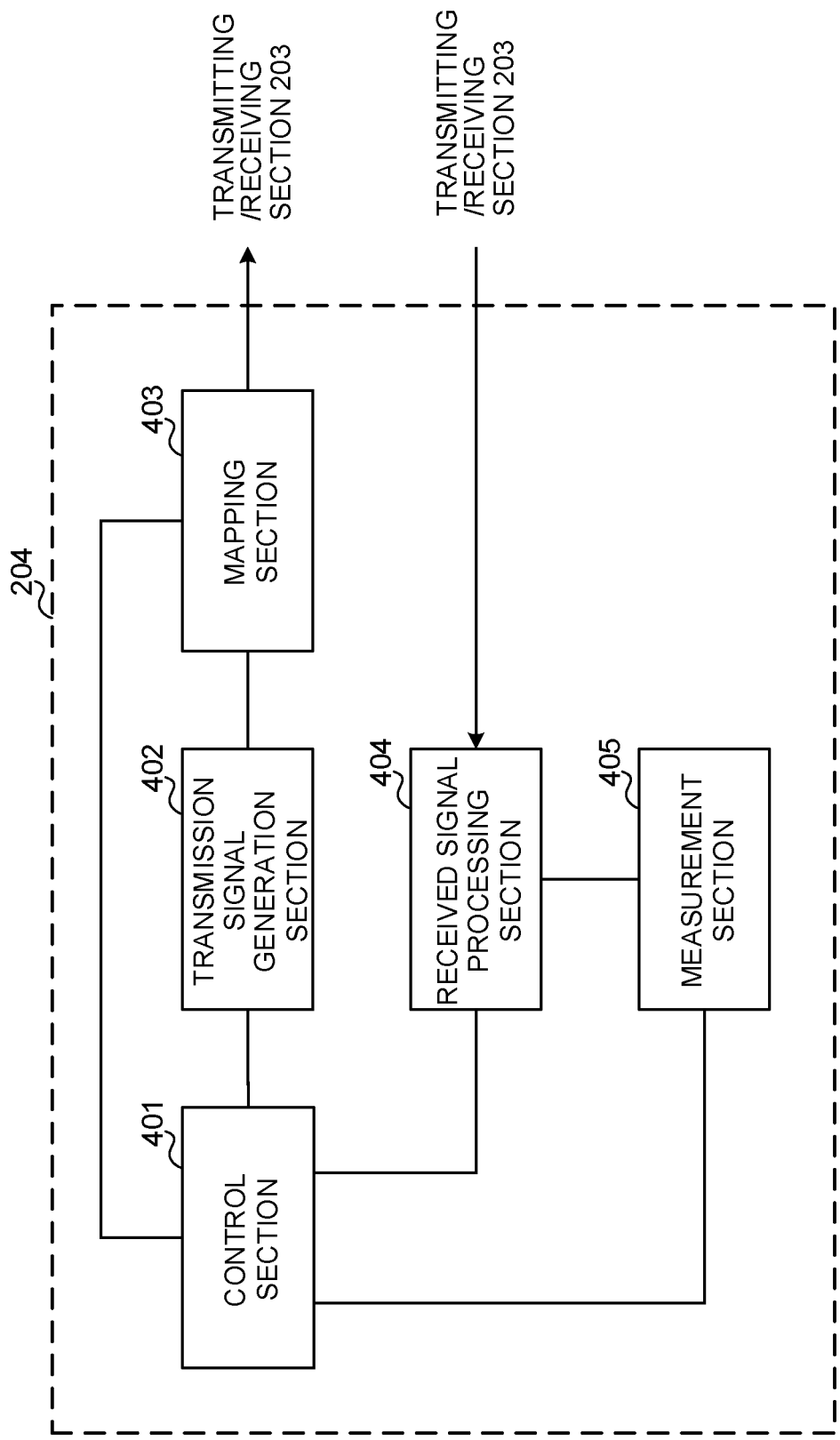
FIG. 16 is a diagram to show an example of a functional structure of the user terminal according to the present embodiment.

FIG. 16 is a diagram to show an example of a functional structure of a user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 determines at least one of rate matching, quasi-co-location, and a resource to be assigned for the physical shared channel transmitted from the plurality of transmission points, based on the downlink control information.

The downlink control information may include at least one of a field for a rate matching indicator and a field for a transmission configuration indicator corresponding to each of the plurality of transmission points.

The control section 401 may determine the number of transmission points from which transmission of the physical shared channel is transmitted, based on at least one of the field for the rate matching indicator and the field for the transmission configuration indicator or a supplementary field.

The control section 401 may determine a certain rate matching pattern out of a plurality of rate matching pattern candidates configured by using at least one of higher layer signaling and MAC signaling, based on the downlink control information.

The downlink control information may include at least one of a field for a rate matching indicator and a field for a transmission configuration indicator corresponding to each of the plurality of transmission points. Alternatively, the downlink control information may include at least one of a resource assignment field in the frequency domain and a resource assignment field in the time domain corresponding to each of the plurality of transmission points.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the present embodiment show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically coupled, or may be realized by directly and/or indirectly connecting two or more physically and/or logically separate pieces of apparatus (via wire and/or wireless, for example) and using these plurality of pieces of apparatus.

Figure 17:
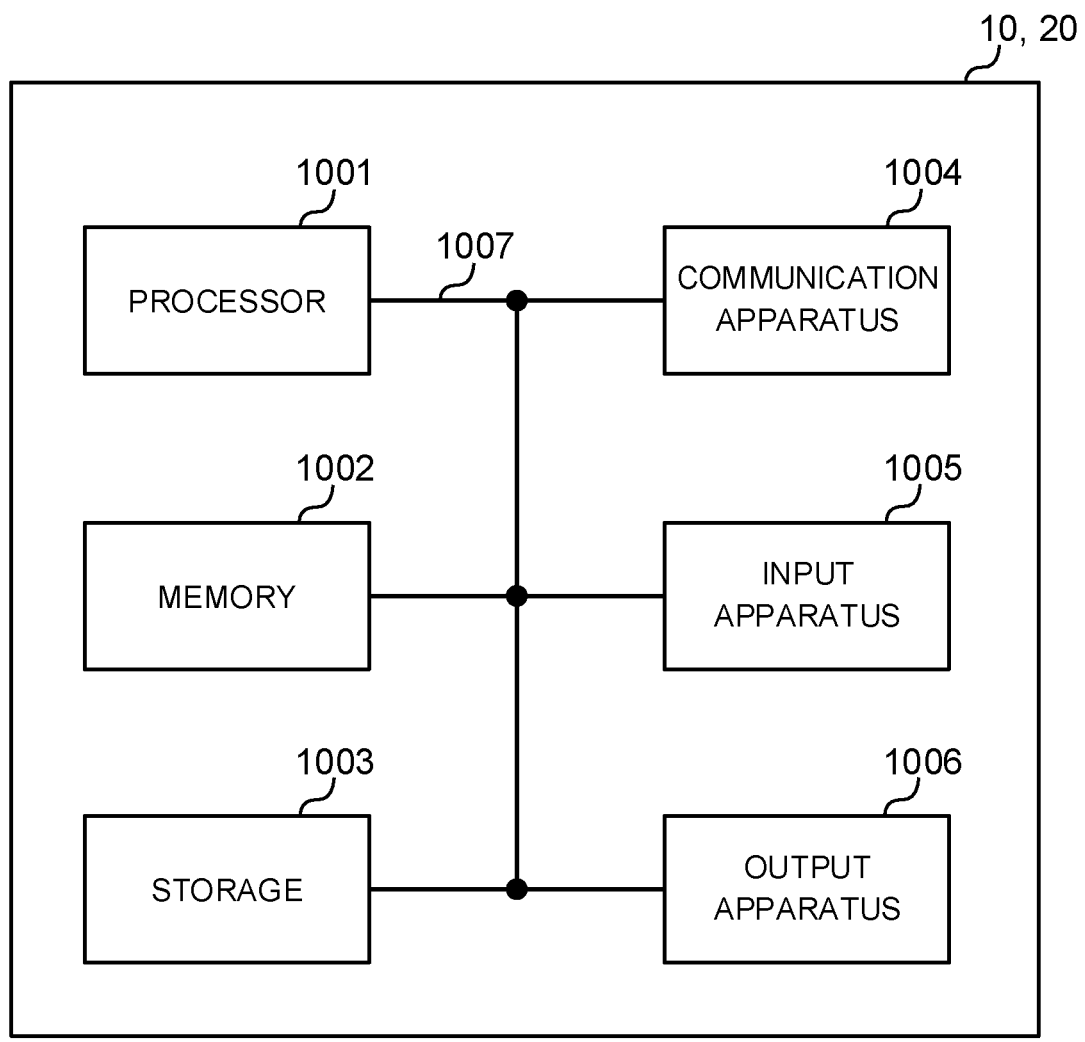
FIG. 17 is a diagram to show an example of a hardware structure of the radio base station and the user terminal according to the present embodiment.

For example, a radio base station, a user terminal, and so on according to the present embodiment may function as a computer that executes the processes of each of the aspects according to the present embodiment. FIG. 17 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the present embodiment described above are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/the present embodiment described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each of the aspects/the present embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

Each of the aspects/the present embodiment illustrated in this specification may be used individually or in combinations, which may be switched depending on the mode of implementation. The order of processes, sequences, flowcharts, and so on that have been used to describe each of the aspects/the present embodiment herein may be re-ordered as long as inconsistencies do not arise. For example, although various methods have been illustrated in this specification with various components of steps in exemplary orders, the specific orders that are illustrated herein are by no means limiting.

Each of the aspects/the present embodiment illustrated in the present specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/ or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used in this specification does not generally limit the quantity or order of these elements. These designations may be used in this specification only for convenience, as a method for distinguishing between two or more elements. Thus, reference to the first and second elements does not imply that only two elements may be employed, or that the first element must precede the second element in some way.

The term "judging (determining)" as used in this specification may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used in this specification mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the present embodiment described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
a receiver that receives a medium access control-control element (MAC CE) activating one or more transmission configuration indicator (TCI) states among one or more TCI states configured by higher layer signaling; and
a processor that determines a number of physical downlink shared channels (PDSCHs) to which receiving processing is performed, based on higher layer signaling associated with time domain resource assignment for PDSCH,
wherein the processor determines that the number of PDSCHs to which the receiving processing is performed is one if a number of TCI states indicated by downlink control information (DCI) among the one or more TCI states activated by the MAC CE is one, and determines that the number of PDSCHs to which the receiving processing is performed is two if a number of TCI states indicated by the DCI among the one or more TCI states activated by the MAC CE is two.

2. The terminal according to claim 1, wherein the processor applies, if two different types of the TCI states are indicated by the DCI, a redundancy version corresponding to one TCI state to one PDSCH among the two PDSCH and a redundancy version corresponding to another TCI state to another PDSCH.

3. The terminal according to claim 1, wherein a time domain resource assignment corresponding to each PDSCH is separately configured when the processor determines that the number of PDSCHs is two.

4. A radio communication method for a terminal comprising:
receiving a medium access control-control element (MAC CE) activating one or more transmission configuration indicator (TCI) states among one or more TCI states configured by higher layer signaling;
determining a number of physical downlink shared channels (PDSCHs) to which receiving processing is performed, based on higher layer signaling associated with time domain resource assignment for PDSCH,
wherein the terminal determines that the number of PDSCHs to which the receiving processing is performed is one if a number of TCI states indicated by downlink control information (DCI) among the one or more TCI states activated by the MAC CE is one, and determines that the number of PDSCHs to which the receiving processing is performed is two if a number of TCI states indicated by the DCI among the one or more TCI states activated by the MAC CE is two.

5. A base station comprising:
a transmitter that transmits, to a terminal, a medium access control-control element (MAC CE) activating one or more transmission configuration indicator (TCI) states among one or more TCI states configured by higher layer signaling; and
a processor that determines a number of physical downlink shared channels (PDSCHs) to which receiving processing is performed by the terminal, based on higher layer signaling associated with time domain resource assignment for PDSCH,
wherein the processor determines that the number of PDSCHs to which the receiving processing is performed is one if a number of TCI states indicated by downlink control information (DCI) among the one or more TCI states activated by the MAC CE is one, and determines that the number of PDSCHs to which the receiving processing is performed is two if a number of TCI states indicated by the DCI among the one or more TCI states activated by the MAC CE is two.

6. A system comprising a terminal and a base station:
wherein
the terminal comprises:
a receiver that receives a medium access control-control element (MAC CE) activating one or more transmission configuration indicator (TCI) states among one or more TCI states configured by higher layer signaling; and
a first processor that determines a number of physical downlink shared channels (PDSCHs) to which receiving processing is performed, based on higher layer signaling associated with time domain resource assignment for PDSCH,
wherein the first processor determines that the number of PDSCHs to which the receiving processing is performed is one if a number of TCI states indicated by downlink control information (DCI) among the one or more TCI states activated by the MAC CE is one, and determines that the number of PDSCHs to which the receiving processing is performed is two if a number of TCI states indicated by the DCI among the one or more TCI states activated by the MAC CE is two;
the base station comprises:
a transmitter that transmits the MAC CE to the terminal; and
a second processor that determines the number of PDSCH to which receiving processing is performed by the terminal.

* * * * *